Feb. 27, 1968      C. D. GIBSON      3,370,337

BALL BEARING MANUFACTURING METHOD

Original Filed Oct. 19, 1964      7 Sheets-Sheet 1

Feb. 27, 1968   C. D. GIBSON   3,370,337
BALL BEARING MANUFACTURING METHOD
Original Filed Oct. 19. 1964   7 Sheets-Sheet 6

United States Patent Office 3,370,337
Patented Feb. 27, 1968

3,370,337
BALL BEARING MANUFACTURING METHOD
Christian D. Gibson, Greene, N.Y., assignor to The Raymond Corporation, Greene, N.Y., a corporation of New York
Original application Oct. 19, 1964, Ser. No. 404,988, now Patent No. 3,332,728, dated July 25, 1967. Divided and this application June 30, 1967, Ser. No. 650,417
7 Claims. (Cl. 29—201)

ABSTRACT OF THE DISCLOSURE

A press device including upper and lower platens having circular recesses to carry racewires and hardened balls spaced around the recesses, with means for simultaneously relatively rotating said platens and forcing them together to form arcuate seats on said racewires. A number of industrial application, many of which relate to material-handling apparatus, require the use of large diameter ball bearings capable of rotatably carrying massive loads.

This invention relates to a press device for use in the manufacture of matched sets of hardened race-wire ball bearings, and is a division of my prior copending application Ser. No. 404,988 filed October 19, 1964 and now Patent No. 3,332,728.

It is a well known fact that steel rings distort when hardened, which is the principal reason why the rings of anti-friction bearings must be ground after hardening if accurate running is to be achieved. The cost of grinding, however, rises so steeply with increase in bearing ring diameter that it is usually uneconomical to use precision-type low friction bearings in large diameters, and thus many applications requiring large diameters have utilized plain sliding bearings, despite the clear advantages of anti-friction bearings.

The undesirable effects of hardening the rings can be avoided either by using unhardened races, or by separating the races from the rings enclosing them. However, a bearing with unhardened races has a restricted load-carrying capacity, so that track indentations frequently occur even under light loading, giving rise to noisy and jerky running of the bearing, and strong shock loads frequently ruin such bearings. Bearings with unhardened races can only be economically employed if the diameter of the bearing is sufficiently large to permit a low specific loading. A number of bearing applications, such as bearing mountings for steerable traction assemblies in compact lift trucks, preclude the use of low specific loadings, due to the heavy loads carried by such trucks and the space limitations.

Because of the above difficulties, the bearing provided by use of the present invention, rather than using unhardened races, provides hardened steel wire inserts within unhardened supporting rings. When assembled, the hardened wire inserts are pressed tightly against the enclosing, unhardened supporting rings, so that the latter are ultimately responsible for accurate running of the bearing.

The use of hardened steel wire inserts to form large-diameter ball bearings is known to the prior art. However, the various forms of wire-race ball bearings known in the prior art are unsuitable for certain applications where particular types of loading are encountered. In general, wire-race ball bearings of the prior art have been suitable for applications involving radial loading and axial loading of approximately the same amounts, but no suitable wire-race ball bearings have been available for applications which principally involve axial loading and relatively little radial loading. Many lift truck applications involve extremely heavy vertical loads due to the heavy loads handled by such trucks, and such vertical loads act axially on a bearing used to support a steerable tractive or drive assembly. The radial loads on such bearings are considerably smaller, however, as they depend more upon the tractive and braking thrusts applied to propel the truck than upon the weight of the heavy load carried by the truck. As the truck turns, the inertia of the load carried by the truck does apply some radial load to the drive assembly bearing, but the speeds and turning rates to which such trucks are limited in order to avoid overturning automatically limit such additional radial loads, so that radial loading is usually slight compared to axial loading, and seldom if ever approaches the magnitude of axial loading. Prior art wire-race bearings designed for principally radial loading, or approximately equal amounts of radial and axial loading, are subject to undue wear when used in some applications, such as the lift truck application mentioned, wherein loading is principally axial. The present invention comprises a machine used to "run-in" a new form of wire-race ball bearings especially adapted to carry principally axial loads. Thus it is one object of the present invention to provide a press device for applying "running-in" forces to an improved wire-race ball bearing adapted to carry principally axial loads.

While hardened steel wires of both circular and rectangular cross section have been used in the prior art as insertable wire races, those of rectangular cross section heretofore have been used in *roller* bearings rather than ball bearings. Wire race *roller* bearings, however, like most other types of roller bearings, are completely incapable of taking appreciable axial loads and are not intended to take axial loads. While the prior art has utilized wire races of circular cross section for ball bearings, a ball bearing adapted to be run-in using the present invention contemplates the use instead of non-circular or rectangular wire races, since it is much easier to provide rectangular recesses in the unhardened steel rings surrounding the wire recesses, and rectangular recesses much better fix the races in place and better support the races, much improving the accuracy and the life of the bearing.

When hardened steel wires of circular cross section have been fabricated in the prior art, a flat surface has been ground along the length of the circular wires prior to "running-in" the bearing assembly, in order that the hardened steel wires present an initially flat surface rather than a rounded surface to the balls, and then as the bearing assembly is "run-in," the balls form a track or groove of arcuate cross section in the flat surface, providing line contact rather than point contact between ball and race in the finished bearing. In order that the arcuate groove have uniform depth along its entire length, it has been necessary that the flat surface be ground on the hardened steel wire very carefully and uniformly, which is time-consuming and expensive. In accordance with one method of the present invention, the wire-races of rectangular cross section are not pre-ground, but instead a corner of each race wire is presented to the balls, and as the assembly is "run-in," the metal forming the corner of each race wire is cold-worked to provide tracks of arcuate cross-section. While it might appear initially that this method of the present invention is preferable to that of the prior art only in that it eliminates the time-consuming grinding operation, it will become evident upon reflection that running-in such an assembly to transform a corner to a groove of arcuate cross section results in considerably more movement of metal than provision of a groove of equivalent depth in a pre-ground flat surface, and because such additional cold-working serves to further harden the wire races, this method provides superior bearings which are less subject to wear.

Other objects of the invention will in part be obvious and will in part appear hereinafter.

For a fuller understanding of the nature and objects of the invention, reference should be had to the following detailed description taken in connection with the accompanying drawings, in which.

Figure 2:
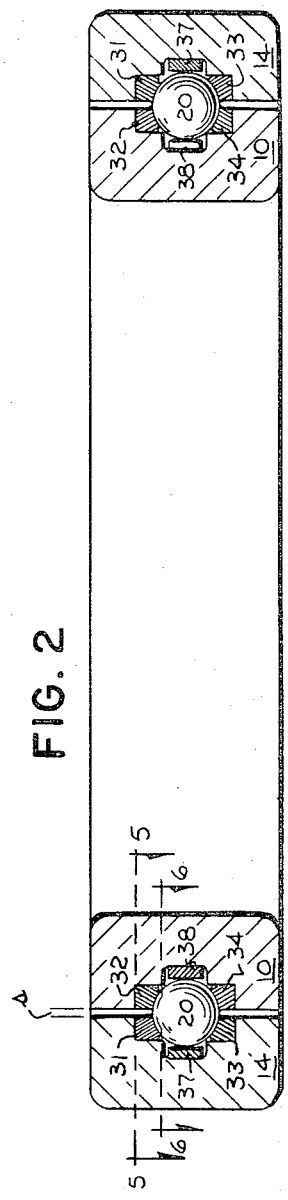
FIG. 2 is a comparable cross section view through a portion of a wire-race bearing assembly constructed to be processed with the present invention.
Figure 11:
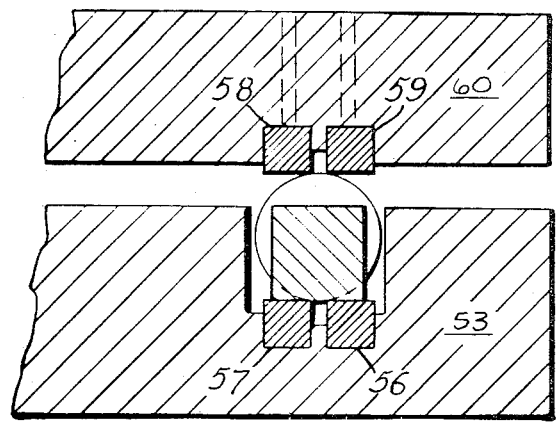
Figure 5:
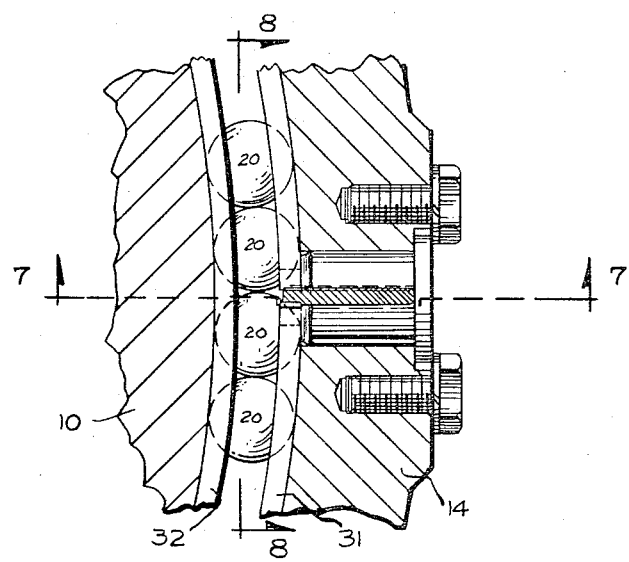
Figure 6:
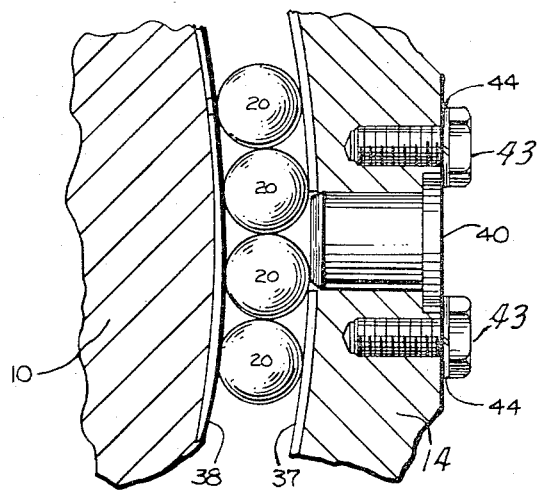
Figure 7:
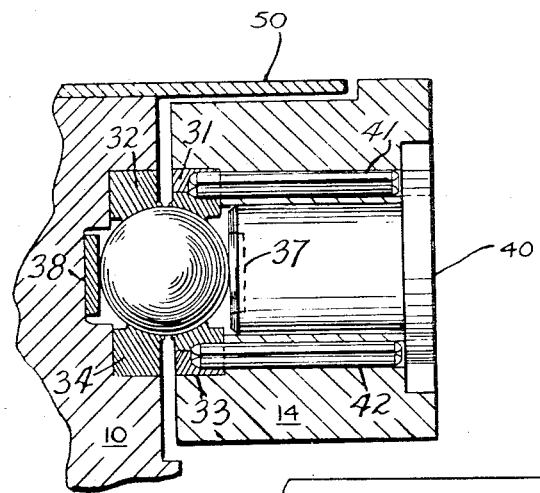
Figure 8:
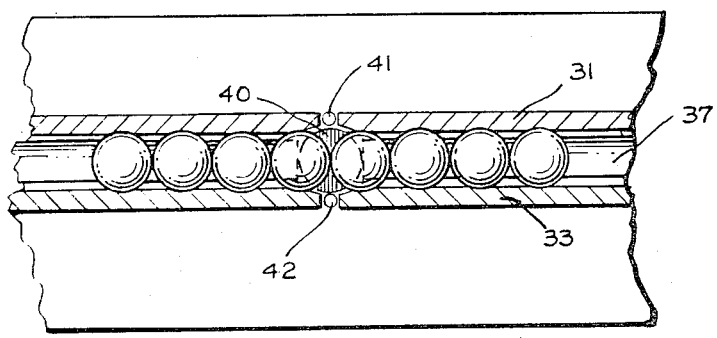
Figure 10:
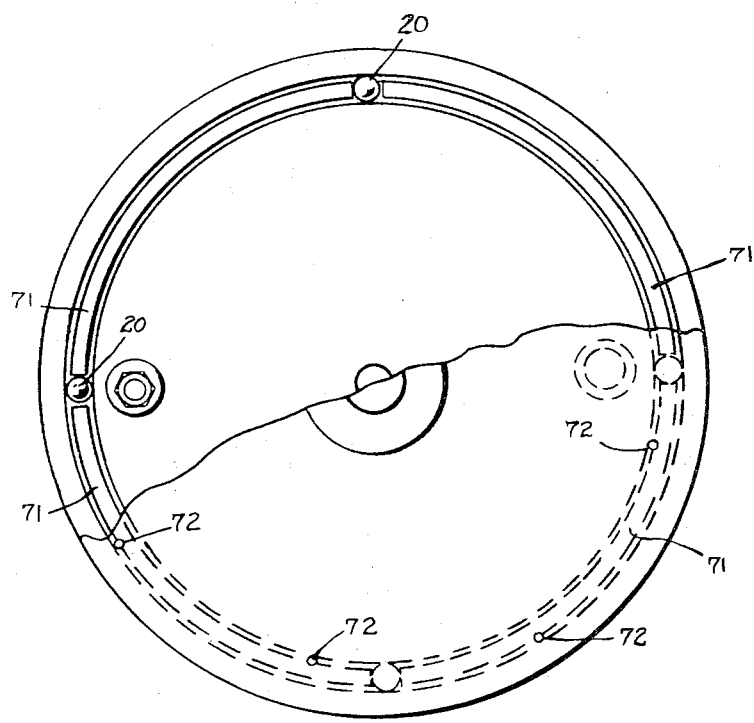
Figure 9:
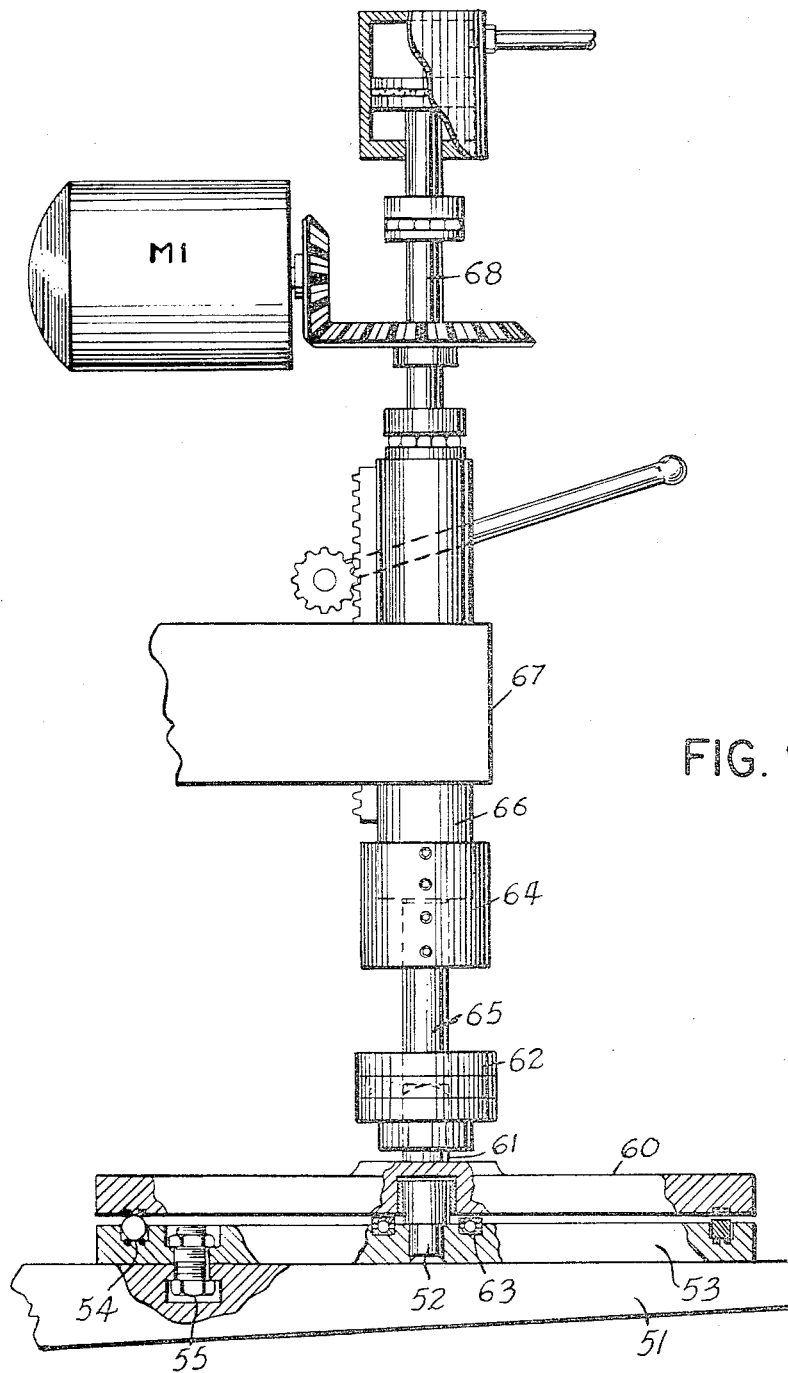

FIG. 5 is a view taken downwardly along lines 5—5 in FIG. 2 and FIG. 6 is a view taken downwardly along lines 6—6 in FIG. 2, with FIGS. 5 and 6 also illustrating an arrangement provided for access to the bearing assembly for removal and replacement of balls;

FIG. 7 is a view taken along lines 7—7 of FIG. 5;

FIG. 8 is a view taken along lines 8—8 of FIG. 5;

FIG. 9 is an elevation view, with certain parts shown in cross section, illustrating the novel hydraulic press running-in device of the present invention;

FIG. 10 is a top view of a portion of the apparatus of FIG. 9, taken along lines 10—10 of FIG. 9, with certain parts shown partially cut away; and FIG. 11 is a cross section view taken along lines 11—11 in FIG. 10.

Figure 1:
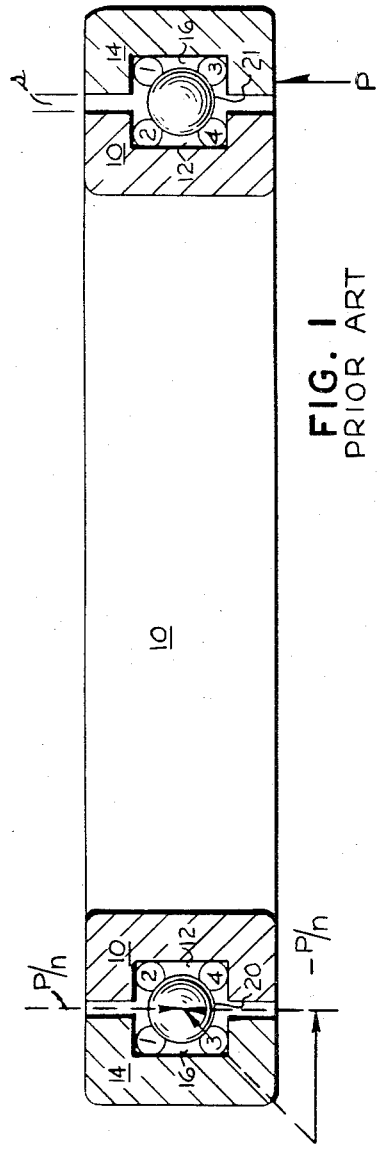
FIG. 1 is a cross section view of a portion of a known prior art wire-race bearing assembly.

The advantages and simplicity of the bearing press of the present invention may be better understood by consideration of the construction of the ball bearing assemblies upon which it is designed to operate, and such assemblies will first be described by way of background. In FIG. 1, a cross section view showing the prior art wire-race bearing assembly, circular rotatable member 10 having a radially inwardly-extending annular recess 12 is subject to a heavy axial load P. Moment loads applied to the bearing will be seen to result in combined axial and radial loads. Stationary supporting ring member 14 is provided with a radially outwardly-extending recess 16. A clearance gap of width s exists between the outer face of inner ring member 10 and the inner face of outer ring member 14. The recesses 12, 16 of members 10 and 14 circularly extend around members 10 and 14, but members 10 and 14 are otherwise often very non-circular, and may comprise complex-shaped castings in various applications. Four hardened steel race wires 1–4 are situated in recesses 12 and 16 as shown, and extend completely around such recesses, except for small gaps (not shown) where the two ends of each race wire meet. A plurality of hardened balls, such as balls 20 and 21 are placed between the race wires as shown, thereby rotatably supporting movable member 10 with respect to stationary member 14. As shown in FIG. 1, each race wire has a generally circular cross section, except for a seat of arcuate cross section which conforms to the radius of the balls 20, 21.

With an axial load force P applied to rotatable member 10, race wire 2 will be seen to be urged downwardly against each ball with a force of $P/N$, where N equals the number of balls provided around the bearing. Each ball will be seen to engage race wire 2 along a small arc, and the $P/N$ force at each ball will be distributed along such an arc. The resultant force applied to each ball acts through the center of the ball and is applied to wire race 3 carried on stationary member 14, which wire race each ball engages throughout a similar small arc. It will be seen that with the arrangement shown, the pure downward axial load P is transmitted radially as well as axially, with a radial component equal to the axial component in the arrangement shown, so that the resultant forces between race wires 2 and 3 and the balls are considerably greater than the vertical load. In FIG. 1, wherein race wires 2 and 3 are equally spaced at 90 degrees around each ball, the resultant force across each ball is equal to $$\frac{P}{N \cos \alpha}$$

where $\alpha$ is the angle between vertical force P and a line connecting the centers of race wires 2 and 3, the angle $\alpha$ being 45 degrees in the prior art assembly of FIG. 1. Thus because the balls resolve axial loads into combined radial and axial loads, the resultant forces between the balls and the race wires are considerably increased. With the arrangement shown in FIG. 1, with the four circular race wires spaced ninety degrees apart around each ball, the resultant force is 41.4% greater than the axial force itself. The application of such increased forces to the balls obviously requires the use of larger diameter bearing assemblies, or the use of harder races and balls, or it results in bearing wear.

In the bearing assembly of the present invention shown in FIG. 2, the resultant forces which axial loads apply to the balls are substantially reduced, allowing much heavier axial loads to be imposed upon the bearing assembly. As shown in cross-section in FIG. 2, the bearing assembly produced with the present invention includes as before, four hardened steel wire race wires, labelled 31–34 in FIG. 2, but also a pair of hardened steel side rings 37 and 38. It is important to note that while race wire 32 is located diametrically across each ball from race wire 33, just as race wire 2 was diametrically across from race wire 3 in the prior art, that race wires 31–34 are not equally spaced at 90 degree intervals around the balls. Instead the arcuate seats of race wires 31 and 32 are spaced much more closely together than 90 degrees, race wires 33 and 34 are spaced together much more closely than 90 degrees, race wires 31 and 33 are spaced apart much more than 90 degrees, and race wires 32 and 34 are also spaced apart much more than 90 degrees. Such an arrangement allows the angle $\alpha$ to be markedly decreased, with the result that axial loads of greater magnitudes can be applied to the bearing assembly. The arrangement shown also applies smaller turning moments to the race wires, so that there is less tendency for the race wires to twist about their own axes.

As will be evident from FIG. 2, upper race wires 31, 32 and lower race wires 33, 34 are each provided with arcuate seats. It may be noted that no arcuate seats are provided in side race wires or bands 37 and 38.

In FIG. 2, the angular distance measured around the ball between centers of the arcuate seats of race pairs 31, 32 and 33, 34 is reduced to approximately 30 degrees, rather than 90 degrees as in the prior art, and correspondingly, the angular distance between centers of the arcuate seats of race pairs 31, 33 and 32, 34 is increased to approximately 150 degrees, rather than the 90 degree spacing of the prior art. With such modified spacing, the angle $\alpha$ is decreased to 15 degrees, and $1/\cos 15°$ equalling approximately 1.035, it will be seen that the resultant forces which an axial load now will apply to the balls will be reduced from 41.4% more than the axial force, to merely 3.5% more than the axial force, drastically increasing the axial load-handling capability of the bearing.

Figure 3:
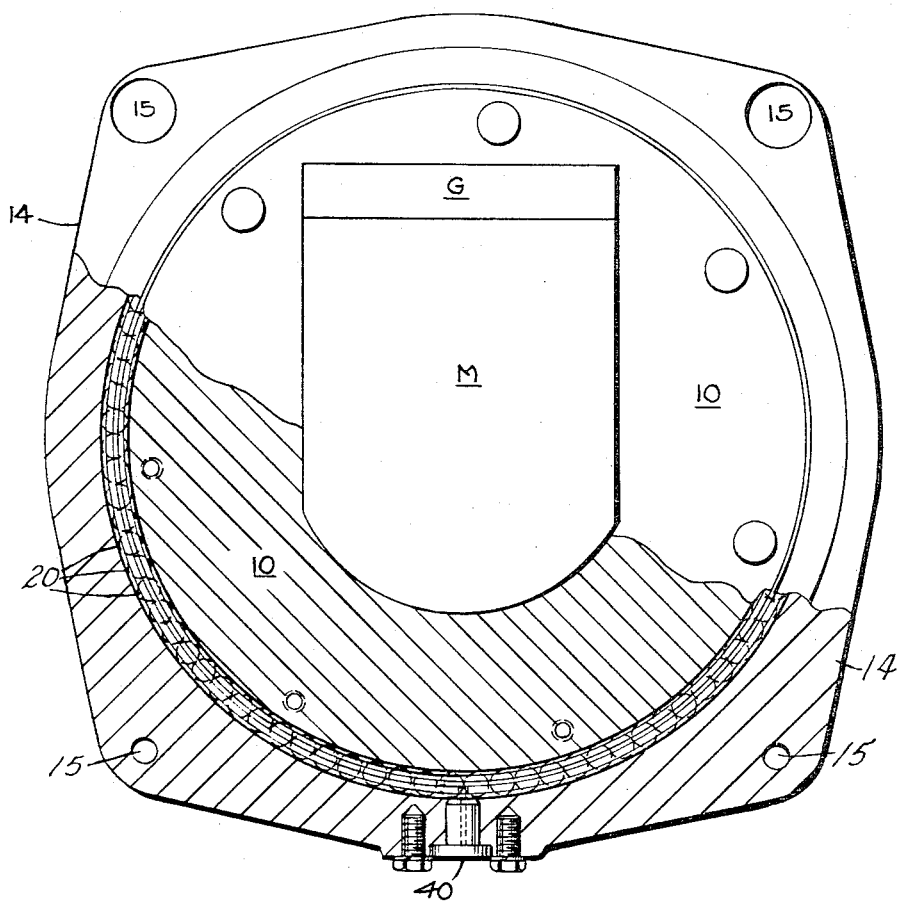
FIG. 3 is a top view, with certain parts cut away, of one form of bearing assembly.
Figure 4:
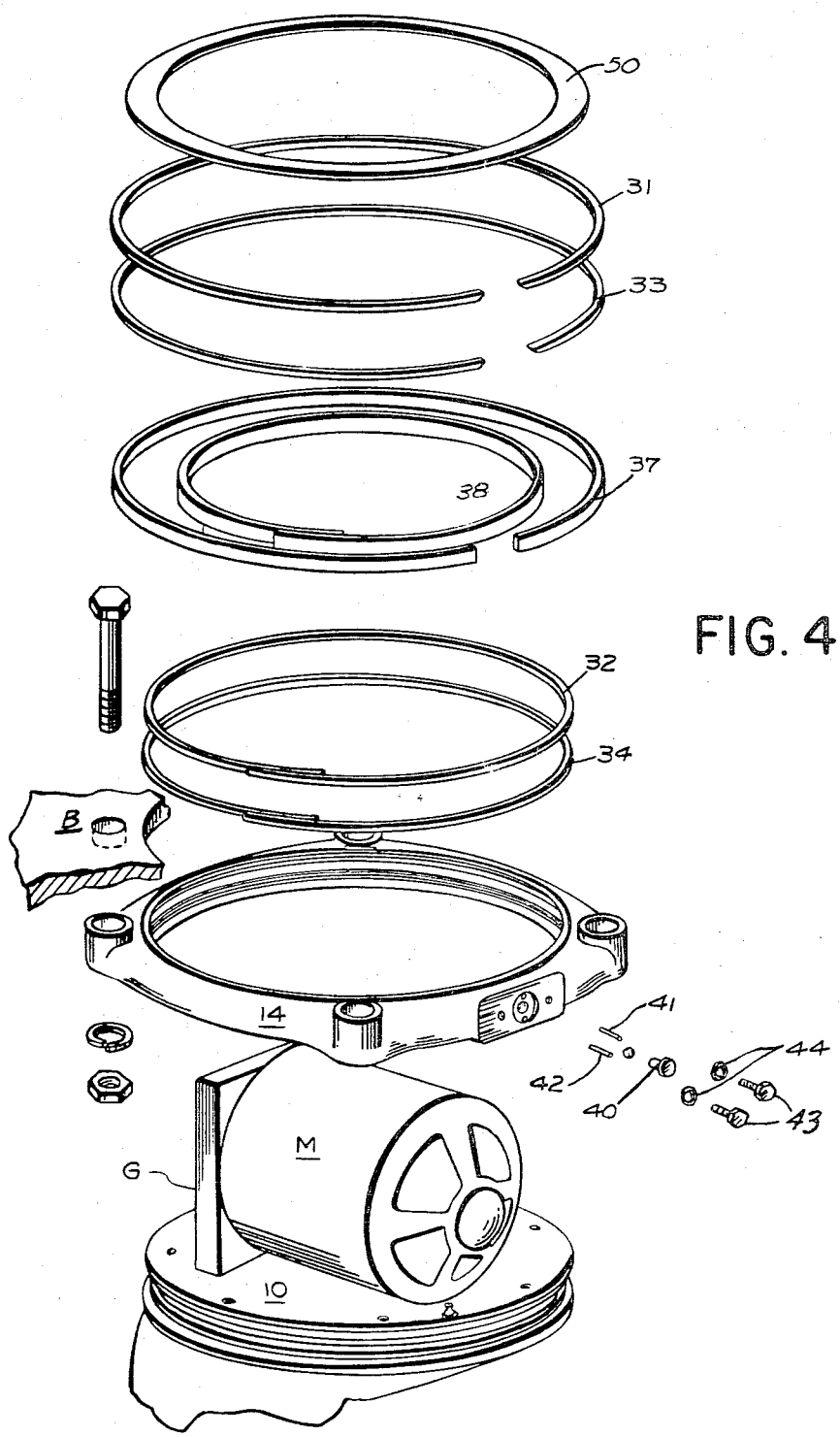
FIG. 4 is an exploded view of the assembly shown in FIG. 3.

A typical complete wire race ball bearing assembly is illustrated in FIGS. 3 and 4, wherein a rotatably mounted lift truck steerable drive assembly bearing is shown.

Shown partially cutaway in FIG. 3, is an outer casting 14 which is provided with a plurality of mounting holes 15, 15 to allow it to be fixed to other structures such as the base frame of a lift truck. Outer casting 14, which need not be hardened, is provided with a large circular bore and serves as the outer supporting ring of the bearing assembly. Concentrically situated within the circular bore of outer supporting ring 14 is circular casting 10, also unhardened, which serves as the inner supporting ring of the bearing assembly. A large number of balls 20, 20 are spaced between relatively-rotatable members 10 and 14, and in FIG. 3 the balls are shown partially obscured by upper race wires 31 and 32. The diameters of the inner and outer castings are selected with respect to the diameter of the balls so that an integral number of balls extend around the bearings, with a very small amount of free space usually less than one ball diameter. At one point around the periphery of outer mounting ring 14 an access opening containing removable access plug 40 is provided.

Shown mounted on inner member 10 is motor M and gear box G. Gearbox G extends downwardly through an opening in member 10 to connect to a truck drive wheel (not shown). Because the truck carries extremely heavy loads, heavy axial loading is applied to the bearing assembly, tending to move outer member 14 downwardly with respect to inner member 10. It will be recognized that application of the improved bearing assembly to a lift truck steerable drive assembly is exemplary only, and that the invention is applicable to a variety of other industrial applications where bearings are subjected to principally axial loading.

As shown in FIG. 2, outer supporting ring 14 is provided with a recess having a first portion which accommodates outer race wires 31 and 33, and a second portion extending further radially outward to accommodate side race wire or band 37. It will become apparent that it is not necessary to provide a recess having exactly the cross-section shown. However, it is important that the cross-section of the recess include at least two portions of non-circular cross-section to accommodate non-circular upper and lower race wires 31, 33, and a flat surface portion to support side race wire 37. Similarly, the cross-section of the radially inwardly-extending recess in inner supporting ring member 10 should include at least two corners or non-circular portions to accommodate non-circular race wires 32 and 34, and a flat portion to support race wire 38. The two recesses in members 10 and 14 and the intermediate space between them is termed the raceway of the bearing.

Race wires 31–34 and 37, 38 are formed from hardened high-grade spring steel, which is resilient in order that the race wires conform to the surfaces of the grooves in inner and outer supporting ring members 10 and 14, and which is hardened to provide bearing strength. The hardness of typical race wires is 35–50 Rockwell "C" scale, and balls 20, 21, etc. generally have a hardness of about 60–70 Rockwell C. Inner and outer ring supporting members 10 and 14 need not have bearing hardness, of course, and ordinarily they are much softer in order that they may be easily machinable.

Figure 2A:
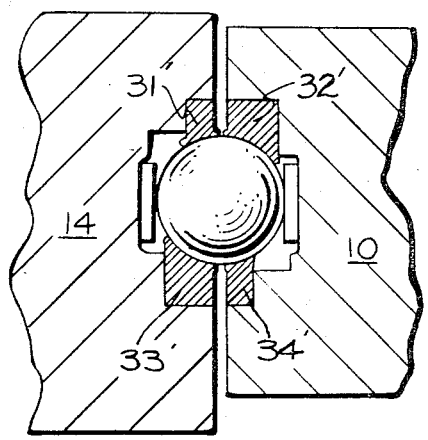
FIG. 2a is a cross section view through an alternate wire race bearing assembly.

Some bearing assemblies may find it advantageous to include race wires having different contact areas, such as the race wire configuration shown in FIG. 2a, wherein upper race wire 32' on inner ring member 10 and lower race wire 33' on outer ring member 14, which two race wires normally carry the axial load, are provided with wider arcuate contact surfaces than race wires 31' and 34', since the latter are much less subject to loading.

Upper and lower inner race wires 32 and 34 are formed around a mandrel (not shown) having a slightly smaller diameter than that portion of the recess against which these race wires are installed, so that race wires 32 and 34 assume a free shape such as shown in FIG. 4, wherein their ends overlap, and when these rings are expanded and installed on inner member 10, they resiliently grip member 10. When installed on member 10, the ends of wires 32 and 34 do not overlap, and to the contrary, the lengths of wires 32 and 34 are selected so that a small gap (of the order of 1/32 inch in a 12" bearing) remains between the ends of each race wire to allow for heat expansion. Race wires 32 and 34 preferably are also bonded in position on member 10 to prevent the scrubbing forces applied to them by the balls from moving them around the raceway. Like wires 32 and 34, inner radial race band 38 is formed with a slightly undersize radius and then expanded when installed so as to resiliently grip inner ring member 10. Band 38 is also preferably bonded.

Upper and lower outer race wires 31 and 33 are formed around a mandrel having a slightly larger diameter than the recess surfaces against which these race wires bear, so that these wires assume an expanded free shape as shown in FIG. 4, with a large gap between the ends of each of these two race wires. When wires 31 and 33 are inserted into the recess in outer member 14, they are compressed, so that their spring force tends to hold them tightly in place within the recess. Similarly, outer radial race band 37 is formed with a slightly oversize radius, and then compressed into place in the recess within outer ring member 14. The length of race band 37 is chosen so that a gap slightly wider than the diameter of a ball remains between the ends of band 37 when it is compressed into place. As will be explained below, this gap between the ends of band 37 is substantially bridged by a removable access plug when the bearing is assembled, so that a surface which is substantially continuous around the entire raceway is provided to receive radial forces from the balls.

The angular positions around member 10 of inner race wires 32, 34 and 38 is unimportant, although it is desirable to stagger the joints between the ends of these three wires to three separate locations around member 10. The angular positions of outer race wires 31, 33 and 37 is important, however, and as will be explained, the ends of each of these race wires are fixedly located adjacent the access hole through which balls are removed and replaced.

The arrangement of the hardened race wires within the recesses of supporting ring members 10 and 14, and the details of the access arrangement to allow ball removal will be clear from reference to FIGS. 5–8. A circular bore hole is provided through outer ring member 14 to accommodate a removable circular access plug 40, which is held in place by bolts 43 (and washers 44), with the head of plug 40 seated against an enlarged diameter portion of the bore to determine the inward extension of plug 40. The length of plug 40 is established to locate the face of the inner end of plug 40 at the same radial position as the inner face of outer side wire 37, and therefore, the balls are continued to be supported radially and are prevented from moving radially outwardly to catch in the access bore as they pass the access bore. If desired, the face of plug 40 may be slightly hollowed to a radius of curvature corresponding to that of the inner face of said wire 37, but then it is necessary that plug 40 be inserted at a proper angular position about is own axis. Marks may be placed on plug 40 and housing 14 to insure that plug 40 is properly oriented.

As best seen in the outward view shown in FIG. 8, the ends of outer race wires 31 and 33 are chamfered to provide a slightly increased vertical spacing or separation distance between these wires at their ends directly adjacent and across the access hole containing access plug 40, so that neither race wire covers any portion of the access hole, thereby allowing a ball which registers with the access hole to be removed when access plug 40 has been removed.

Each end of both outer race wires 31 and 33 is partly chamfered and partly squared. Upper and lower locating pins 41 and 42 are force-fitted into holes above and below plug 40 to extend a short distance into the raceway, as best shown in FIG. 7. The squared portions of the ends of outer race wires 31 and 33 butt against the inner ends of pins 31 and 33, and hence outer race wires 31 and 33 are restrained against appreciable movement around the raceway, thereby insuring that the chamfered ends of race wires 31 and 33 remain adjacent the access bore, which is necessary for ball removal. Movement of inner race wires 32, 34 and 38 around the raceway does not interfere, of course, with ball removal, and hence it is unnecessary to positively restrain such movement by means of pins or the like.

The novel apparatus of the instant invention, which is specifically designed for "running-in" the upper and lower race wires for a wire-race bearing assembly is shown and described in connection with FIGS. 9–11. As mentioned above, the wire races previously used for ball bearing assemblies have been circular in cross section, and the arcuate seats or tracks in such races have been run in first by grinding a flat surface on such wires, and then applying greater-than-normal load forces to such a gearing in order to deform it by cold-working to provide the tracks of arcuate cross section along the lengths of the races. In accordance with the present invention, wires of rectangular, or at least non-circular cross section are provided and no grinding operation is necessary. Furthermore, preparatory to the races being run-in to provide the tracks of arcuate cross section, the rectangular wire-races are fixed in a jig so as to present a corner rather than a flat surface to the balls used in the "running-in" process.

FIG. 9 shows the novel arrangement for running-in wire races. In accordance with the present invention, four wire races intended to be used as wires 31–34 of a bearing assembly are run-in together, and thereafter treated as a matched set. In FIG. 9 stationary work table 51 carries a lower platen 53 comprising a circular plate having a circular recess 54 which extends completely around plate 53, lower platen 53 being fixedly bolted to work table 51, by means of bolts such as 55. An upwardly-extending central axle 52 is journalled in the center of lower platen 53 to rotatably support upper platen 60. Recess 54, as better seen in the enlarged view of FIG. 11, is provided with two bottom recesses 56 and 57, into which race wires of appropriate length to form lower race wires 33 and 34 are situated. Thrust bearing 63 is mounted in lower platen 53 to serve as a vertical stop to maintain a predetermined minimum distance between platens 53 and 60. Wires destined to form upper race wires 31 and 32 are similarly located in upper platen 60, in recesses 58 and 59, as best seen in FIG. 11.

Upper platen 60 is provided with an upwardly extending shaft 61 arranged coaxially with axle 52, and shaft 61 is connected by flexible coupling 62 to shaft 65. Shaft 65 is connected to be rotated by rigid coupling 64, which in some embodiments of the invention may take the form of a drill chuck. Coupling 64 is both rotated and reciprocated vertically by hollow shaft 66, which is supported for vertical movement by drill press frame 67.

As best seen in FIG. 10, the wire races are "run-in" using a limited number of balls 20 (four being shown in FIG. 10, wherein a portion of upper plate 60 is cutaway). During the run-in process, the four balls are maintained 90 degrees apart by means of arcuate spacer bars 71, 71 preferably formed of a soft metal such as brass.

Motor M–1 is geared to rotate shaft 68, whilch is keyed to shaft 66, thereby rotating upper platen 60. As the upper platen is rotated, pressure is applied to shaft 68, forcing upper platen 60 and wires 31, 32 down toward lower platen 53. In a typical application motor M–1 drives upper platen 60 at 100–200 r.p.m., and a gradually increasing downward force is hydraulically applied to shaft 68, by means of a conventional hydraulic cylinder-piston assembly 70. When running-in has progressed to a point where thrust bearing 59 prevents further travel of upper platen 60, the race wires within upper and lower platens 53 and 60 will be "cratered" to a proper depth. A plurality of holes 72, 72 are provided in upper platen 60 to admit a punch to aid in removal of the cratered wires from upper platen 60.

As the running-in process begins, all four race wires initially present rectangular corners to the four balls. As hydraulic force is applied and the balls cold-work the race wires, seats or crater-like tracks having an arcuate cross-section of the nature shown in FIG. 2 are provided. Because transforming the corner of a rectangular bar to a track of arcuate cross section involves greater cold-working of the wire races and more metal movement to produce an arcuate seat of given contact length, the process of the present invention provides harder and more durable races, and thereby improves bearing life.

It will thus be seen that the objects set forth above, among those made apparent from the preceding description, are efficiently attained, and, since certain changes may be made in carrying out the above method without departing from the scope of the invention, it is intended that all matter contained in the above descriptions or shown in the accompanying drawings shall be interpreted as illustrative and not in a limiting sense.

The embodiments of the invention in which an exclusive property or privilege is claimed are defined as follows:

1. Apparatus for providing matched sets of hardened race wires for use in ball bearing assemblies, comprising, in combination: a fixed lower platen having a first shaft means extending beyond one face of said paten and first circular recess means in said face of said platen concentrically disposed with respect to said shaft means, said recess means being adapted to carry first and second race wires; thrust bearing means mounted concentrically with said shaft means and extending beyond said face of said platen; an upper platen having bearing means adapted to receive the extending end of said shaft means and second circular recess means in the lower face of said upper platen, said second circular recess means being concentrically disposed with respect to said bearing means, facing said first circular recess means and adapted to carry third and fourth racewires; a plurality of hardened balls situated in said first circular recess means; and means for rotating said upper platen about the axis of said shaft means and for simultaneously forcing said upper platen toward said lower platen.

2. Apparatus according to claim 1 in which said first circular recess means comprises a circular slot generally of rectangular cross section, with first and second recesses in the bottom of said first circular recess means for carrying said first and second racewires.

3. Apparatus according to claim 1 in which said second circular recess means is adapted to carry said third and fourth racewires with portions of said third and fourth racewires extending beyond said lower face of said upper platen.

4. Apparatus according to claim 1 having a plurality of arcuate unhardened bars disposed in said first circular recess between pairs of said hardened balls.

5. Apparatus according to claim 1 in which the last-recited means comprises second shaft means connected to said upper platen and aligned with said first shaft means, motive means connected to rotate said second shaft means, and flexible shaft-coupling means connecting said motive means to said second shaft means.

6. Apparatus according to claim 1 in which the last-recited means includes a hydraulic piston-cylinder assembly for forcing said upper platen toward said lower platen.

7. Apparatus according to claim 1 in which the last-recited means comprises a second shaft means connected to said upper platen, motor means connected to rotate said shaft means, and a hydraulic piston-cylinder assembly connected to force said second shaft means and said upper platen toward said lower platen, said thrust bearing means being operable to limit movement of said upper platen.

References Cited
UNITED STATES PATENTS

| | | | |
|---|---|---|---|
| 2,399,847 | 5/1946 | Bauersfield | 308—216 |
| 2,917,351 | 12/1959 | Franke et al. | 29—148.4 X |
| 2,929,131 | 3/1960 | McCloskey | 29—201 X |
| 3,081,135 | 3/1963 | Olson | 308—195 |
| 3,099,073 | 7/1963 | Olson | 29—148.4 |
| 3,109,223 | 11/1963 | McCloskey | 29—201 X |
| 3,332,728 | 7/1967 | Gibson | 308—193 |

THOMAS H. EAGER, *Primary Examiner.*